Figure 7:
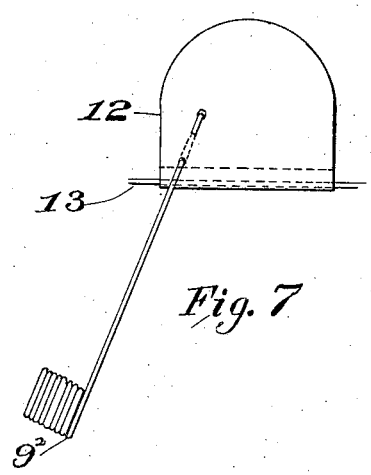

No. 848,765. PATENTED APR. 2, 1907.
C. PEMBERTON & W. S. MACDONALD.
ANIMAL TRAP.
APPLICATION FILED MAY 18, 1906.
2 SHEETS—SHEET 1.
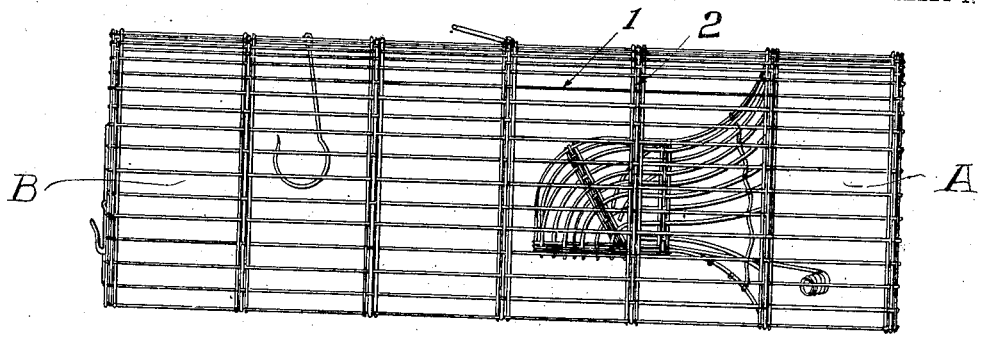
*Fig. 1*
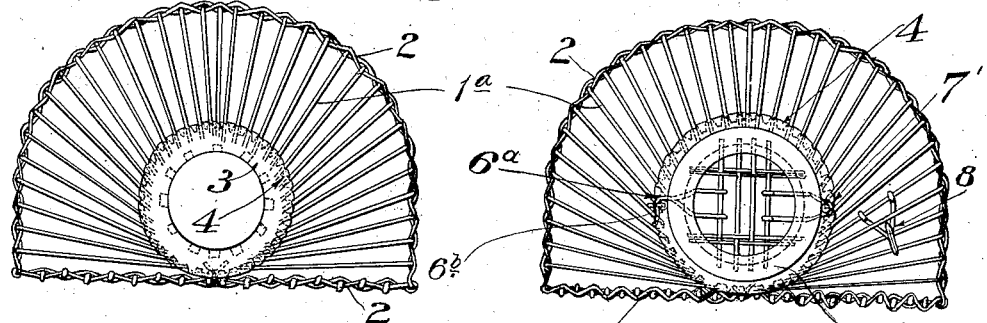
*Fig. 2.* *Fig. 3*
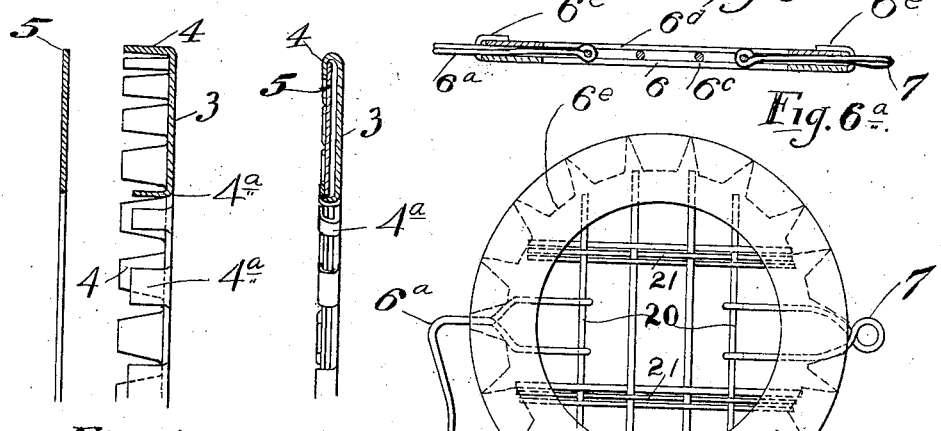
*Fig. 4* *Fig. 5*
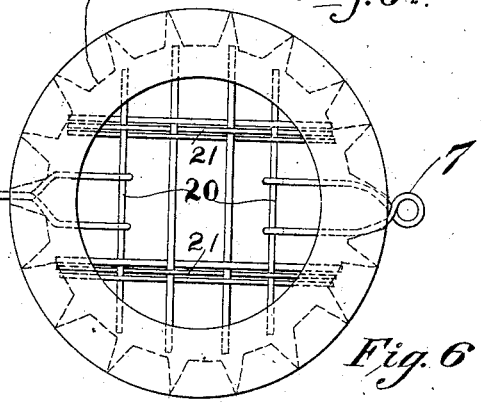
*Fig. 6*
Witnesses
M. F. Bunker
Eli Rowles
Inventors
Charles Pemberton
William Sandfield Macdonald No. 848,765. PATENTED APR. 2, 1907.
C. PEMBERTON & W. S. MACDONALD.
ANIMAL TRAP.
APPLICATION FILED MAY 18, 1906.

2 SHEETS—SHEET 2.

Witnesses.
M. T. Brinker
Eli Rowles

Inventors,
Charles Pemberton
William Sandfield Macdonald

UNITED STATES PATENT OFFICE.

CHARLES PEMBERTON, OF CAMP CHASE, AND WILLIAM SANDFIELD MACDONALD, OF COLUMBUS, OHIO.

ANIMAL-TRAP.

No. 848,765.      Specification of Letters Patent.      Patented April 2, 1907.

Application filed May 18, 1906. Serial No. 317,627.

*To all whom it may concern:*

Be it known that we, CHARLES PEMBERTON, a citizen of the United States, residing at Camp Chase, in the county of Franklin and State of Ohio, and WILLIAM SANDFIELD MACDONALD, a citizen of the United States, residing in Columbus, in the county of Franklin and State of Ohio, have invented a new and useful Animal-Trap, designed, primarily, to entrap rats and mice through the aid of a bait placed in the trap proper, entrance to which is had first through an opening in the end of the trap into a space occupying about one-fourth the length of the body of the trap, which is to be known hereafter as the "vestibule" or "playground," which the animal may enter and leave at will, thus gaining familiarity with the trap as a whole previous to being entrapped into the cage or trap proper by the display of a suitable bait contained inside the cage of the trap, said cage of the trap to be entered through a door arranged in a division contained in the body of the trap about one-fourth the length of the trap beyond the entrance of the trap's body.

The body of the trap is constructed of any suitable wire of proper size, which is woven, preferably, either in the exact length and width of the trap or in a larger piece from which two or more traps may be cut into size and shape previous to forming the body of the trap into the desired shape.

Our invention relates to animal-traps, and more particularly to a trap designed to entrap rats and mice, and has for its object provision of a device of this character the body portion of which is constructed in a cheap and novel manner, as will be hereinafter set forth.

A further object of the invention is the provision of a trap comprising a body which is divided by a partition into the trap-body proper and a vestibule or playground, said partition having a passage-way formed therethrough which is opened to the passage of the animals passing from the playground to the body of the trap, but which automatically closes to prevent their return.

A further object of the invention is the provision of a trap of the character described composed of a plurality of longitudinal wires, the ends of which are bent to form the ends of the trap, together with novel means for securing said ends and at the same time forming an entrance in the end wall of the trap.

Further objects and advantages of the invention will be set forth in the detailed description which now follows.

Figure 8:
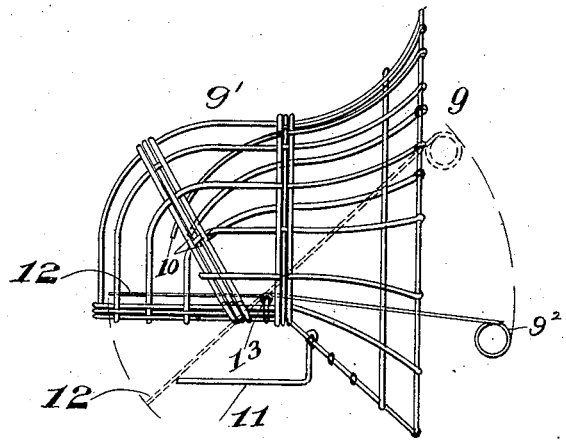
Figure 9:
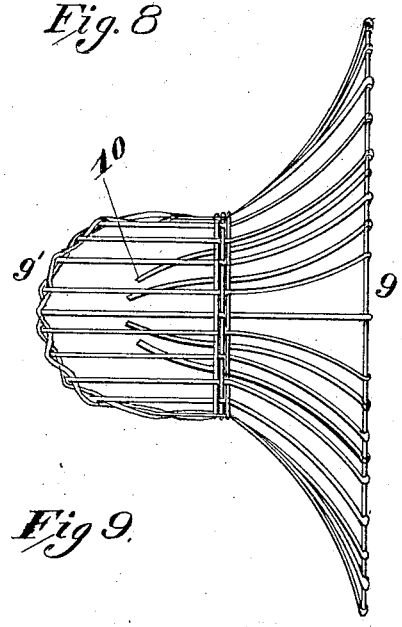

In the accompanying drawings, Figure 1 is a side elevation of an animal-trap constructed in accordance with the invention. Fig. 2 is an end elevation of said trap looking at the right-hand end of the trap illustrated in Fig. 1. Fig. 3 is a like view looking toward the left-hand end of the trap shown in Fig. 1. Fig. 4 is a partial sectional view, upon an enlarged scale, of a washer and collar hereinafter described. Fig. 5 is a view of said collar and washer after they have been secured together. Fig. 6 is a detailed front elevation of a door adapted to close the opening in the left-hand end of the trap illustrated in Fig. 3. Fig. 6$^a$ is a horizontal section through said door. Fig. 7 is a plain view of a trap-door and weight, which will be hereinafter described. Fig. 8 is a side view of the partition which separates the playground from the body portion of the trap, and Fig. 9 is a plan view of said partition.

Like numerals designate corresponding parts in all of the figures of the drawings.

The trap herein shown and described comprises a plurality of longitudinal body-wires 1, the ends of said wires being bent inwardly, as at 1$^a$, to form the ends of the trap. Framing-wires 2 space the wires 1 apart and brace and strengthen the trap. These wires 2 are woven between the wires 1, as is best illustrated in Fig. 2, said framing-wires extending entirely around the trap. These wires may be of any desired number; but we prefer to employ a series of them, each of said series consisting of three wires, (see Fig. 1,) the central wire of each of said series passing over the body-wires 1, which the outside wires of said series pass under.

The ends of the wires 1$^a$ which form the ends of the trap are secured in position, as follows: A collar 3 is provided with a plurality of inwardly-directed lugs 4 and 4$^a$, it being apparent from the inspection of Figs. 2 and 4 that this collar is in the form of a ring. The collar 4 is placed in position with the ends of the wires projecting between the lugs 4, after which a washer 5 is placed in position and the lugs 4 and 4$^a$ are bent over the edges of said washer to clamp said washer to the collar and to clamp the ends of the wires between said washer and said collar. A washer and collar, such as have been heretofore described, secure the ends of wires 1ª at each end of the trap. The central opening formed through the collar (illustrated in Fig. 2) provides an entrance for the animals to the playground of the trap. The opening which would otherwise be left at the opposite end of the trap is normally closed by a door 6. This door 6 is provided upon one side with a spring-hook 6ª and upon the opposite side with an eyelet 7, said eyelet providing means for pivoting the door to the collar 3, as at 7' in Fig. 3. The spring-hook 6ª is adapted to engage a pin 6ᵇ, carried by the collar 3 in Fig. 3. A stop 8 limits the movement of the door and supports said door when in its open position, the movement of said door being a swinging one in a vertical plane. A partition 9 (see Figs. 8 and 9) divides the body of the trap into two parts—viz., a playground A and a body portion B. The wires forming this partition are bent in such manner as to form a hood 9', each alternate wire of said partition projecting into the hood and terminating in flexible prongs 10. A trap-door 12 is pivoted at 13 and carries a weight 9². This trap-door is of the usual and well-known construction in traps of this character and requires no further description. Rat-traps embodying the general principles of operation of the trap herein shown and described are old in the art. Our invention relates particularly to the means for connecting the ends of the wires which form the ends of the trap and in providing the flexible prongs immediately above the trap-door and in the method of weaving a series of transverse framing-wires into the mesh or body-wires of the trap in such manner that we secure the requisite strength and rigidity without the employment of large wires for said framing-wires.

A further point of novelty resides in the construction of the door shown in Figs. 6 and 6ª. This door comprises a plurality of vertical wires 20 and a plurality of horizontal wires 21, said horizontal wires being woven through the vertical wires in the same manner that the framing-wires 2 are woven in the body-wires 1 of the trap. The ends of the mesh are clamped between a collar 6ᶜ and a washer 6ᵈ in the same manner that the ends of the wires 1ª are clamped between the collar 3 and the washer 5, said collar 6ᶜ being provided with lugs 6ᵉ, as is best shown in Fig. 6ª, said lugs being adapted to be bent over the edge of the washer 6ᵈ. The hook 6ª is secured to one of the vertical wires 20, and the eyelet 7 is also secured to one of said vertical wires.

While the elements shown and described are well adapted to serve the purposes for which they are intended, it is to be understood that the invention is not limited to the precise construction set forth, but includes within its purview such changes as may be made within the scope of the appended claims.

Having described our invention, what we claim is—

1. A rat-trap comprising a plurality of body-wires and a plurality of series of framing-wires, each of said series of framing-wires consisting of three wires which lie very close together, said wires being woven in and out between the body-wires, the central wire of each of said series passing over the body-wires which the outside wires of each of said series pass under whereby the trap-body is braced at intervals by said series of framing-wires.

2. A door for a trap comprising a wire mesh and a pair of clamping members which surround said wire mesh and which clamp the outer ends of said wire mesh between them.

3. A door for a trap comprising a wire mesh, a collar, a washer means for clamping said collar to said washer and for clamping the ends of the wires mesh between the said collar and said washer, a hook carried by said door and a hinge also carried by said door.

4. In a trap, the combination with a body portion formed with a plurality of longitudinally-extending wires, the ends of which are bent to form the ends of the trap, of an annular collar, an annular washer, and lugs carried by the collar and adapted to be bent over the annular washer, the free ends of the body-wires entering between said lugs and being clamped between the washer and the collar.

5. A rat-trap having a body portion which is composed of a plurality of longitudinally-extending wires, the ends of said wires being bent at right angles to form a flat-ended trap, a washer, a collar carrying a plurality of members adapted to be bent over the edges of the washer, the free ends of the wires at the end of the trap entering between said members and being clamped between the washer and the collar.

6. A rat-trap composed of a plurality of longitudinally-extending body-wires, and a plurality of series of framing-wires which are woven in and out between said body-wires transversely of the trap, each of the series of the framing-wires comprising a plurality of wires which lie close together whereby said series form stiffening-ribs transversely of the trap and at intervals throughout the length thereof.

CHARLES PEMBERTON.
WILLIAM SANDFIELD MACDONALD.

Witnesses:
M. T. BRINKER,
ELI ROWLES.